US009895026B2

(12) United States Patent
Roberts et al.

(10) Patent No.: US 9,895,026 B2
(45) Date of Patent: Feb. 20, 2018

(54) FOOD PROCESSING DEVICE JAR LOCK

(71) Applicant: WHIRLPOOL CORPORATION, Benton Harbor, MI (US)

(72) Inventors: Anthony S. Roberts, Granger, IN (US); Jeremy T. Wolters, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/611,383

(22) Filed: Jun. 1, 2017

(65) Prior Publication Data
US 2017/0265684 A1 Sep. 21, 2017

Related U.S. Application Data

(62) Division of application No. 14/190,203, filed on Feb. 26, 2014, now Pat. No. 9,700,177.

(60) Provisional application No. 61/771,760, filed on Mar. 1, 2013.

(51) Int. Cl.
*A47J 43/046* (2006.01)
*A47J 43/07* (2006.01)

(52) U.S. Cl.
CPC .......... *A47J 43/046* (2013.01); *A47J 43/0716* (2013.01); *Y10T 29/49826* (2015.01)

(58) Field of Classification Search
CPC ..... F16D 1/101; A47J 43/046; A47J 43/0716; A47J 43/075; A47J 43/0761; H02K 5/24; F16B 5/0266; F16B 5/0241; F16F 15/121
USPC .......................................... 366/205
See application file for complete search history.

(56) References Cited

U.S. PATENT DOCUMENTS

| 3,786,999 A | * | 1/1974 | Cabell ................... A47J 43/046 241/282.1 |
| 3,789,999 A | | 1/1974 | Cabell |
| 3,848,524 A | | 11/1974 | Semrow |
| 4,799,636 A | | 1/1989 | Hickel et al. |
| 5,460,082 A | | 10/1995 | Kooyker et al. |
| 5,524,530 A | | 6/1996 | Nijzingh et al. |

(Continued)

FOREIGN PATENT DOCUMENTS

| DE | 1091718 B | 10/1960 |
| DE | 3335139 A1 | 11/1985 |

OTHER PUBLICATIONS

European Patent Application No. 14157095.2 filed Feb. 27, 2014, Applicant: Whirlpool Corporation, European earch Report re: same, dated Jul. 17, 2014.

*Primary Examiner* — Tony G Soohoo
*Assistant Examiner* — Elizabeth Insler
(74) *Attorney, Agent, or Firm* — Price Heneveld LLP

(57) ABSTRACT

A food processing machine having a base and a cylindrical jar lock extending upwardly from a top surface of the base. A jar assembly has a jar and a collar that extends downwardly from the jar. The collar is adapted to fit circumferentially around the cylindrical jar lock. A plurality of locking tabs extend radially inwardly from the collar. The locking tabs engage with the cylindrical jar lock and prevent vertical movement of the jar while allowing rotational movement of the jar and linear movement of the jar with respect to the base in the xy-plane. The cylindrical jar lock is optionally spring-mounted to the base to provide dampened movement in the vertical direction of the cylindrical jar lock with respect to the base.

16 Claims, 3 Drawing Sheets

(56) References Cited

U.S. PATENT DOCUMENTS

| | | |
|---|---|---|
| 5,636,923 A | 6/1997 | Nejat-Bina |
| 6,189,441 B1 | 2/2001 | Beaudet et al. |
| 6,350,053 B1 | 2/2002 | Morin |
| 7,690,592 B2 | 4/2010 | Ferraby |
| 2004/0042337 A1 | 3/2004 | Yiu et al. |
| 2006/0198241 A1 | 9/2006 | Krishnachaitanya et al. |
| 2012/0026827 A1 | 2/2012 | Audette |
| 2012/0027902 A1* | 2/2012 | Audette .............. A47J 43/0777 426/518 |
| 2012/0152131 A1 | 6/2012 | Sands |

\* cited by examiner

FOOD PROCESSING DEVICE JAR LOCK

CROSS-REFERENCE TO RELATED APPLICATION

The present application is a divisional of U.S. patent application Ser. No. 14/190,203 filed Feb. 26, 2014, entitled "FOOD PROCESSING DEVICE JAR LOCK," now U.S. Pat. No. 9,700,177, issued Jul. 11, 2017, which also claims priority to and the benefit under 35 U.S.C. § 119(e) of U.S. Provisional Patent Application No. 61/771,760, filed Mar. 1, 2013, entitled "BLENDER JAR LOCK," which are hereby incorporated herein by reference in their entirety.

BACKGROUND

The present concept generally relates to a jar lock for a food processing device, also referred to as a blender herein.

SUMMARY

One aspect of the present concept includes a food processing machine having a base and a cylindrical jar lock extending upwardly from a top surface of the base. A jar assembly has a jar and a collar that extends downwardly from the jar. The collar is adapted to fit circumferentially around the cylindrical jar lock. A plurality of locking tabs extend radially inwardly from the collar. The locking tabs engage with the cylindrical jar lock and prevent vertical movement of the jar with respect to the cylindrical jar lock while allowing rotational movement of the jar and linear movement of the jar with respect to the base in the xy-plane.

Another aspect of the present concept includes a food processing machine having a base with a motor disposed therein. A cylindrical jar lock extends upwardly from a top surface of the base. The cylindrical jar lock is mounted to the base in a manner that permits a range of vertical motion of the cylindrical jar lock with respect to the base. A jar assembly has a jar and a collar that extends downwardly from the jar. The collar is adapted to fit circumferentially around the cylindrical jar lock. A plurality of locking tabs extend radially inwardly from the collar. The locking tabs mechanically engage with the cylindrical jar lock to prevent vertical movement of the jar with respect to the cylindrical jar lock.

Another aspect of the present concept includes a method of manufacturing a food processing machine, including the steps of disposing a motor within a base and operably connecting a lower coupler to the motor, with the lower coupling extending upwardly from the motor. A cylindrical jar lock is spring-mounted to the base, with the cylindrical jar lock positioned radially outwardly from the lower coupler and permitted to move over a predetermined vertical range with respect to the base. A jar assembly with a jar and a collar is formed. The collar is adapted for removable mechanical engagement with the cylindrical jar lock. An upper coupler extends downwardly from the jar and is adapted to removably mechanically engage the lower coupler.

These and other aspects, objects, and features of the present concept will be understood and appreciated by those skilled in the art upon studying the following specification, claims, and drawings.

DETAILED DESCRIPTION

Figure 1:
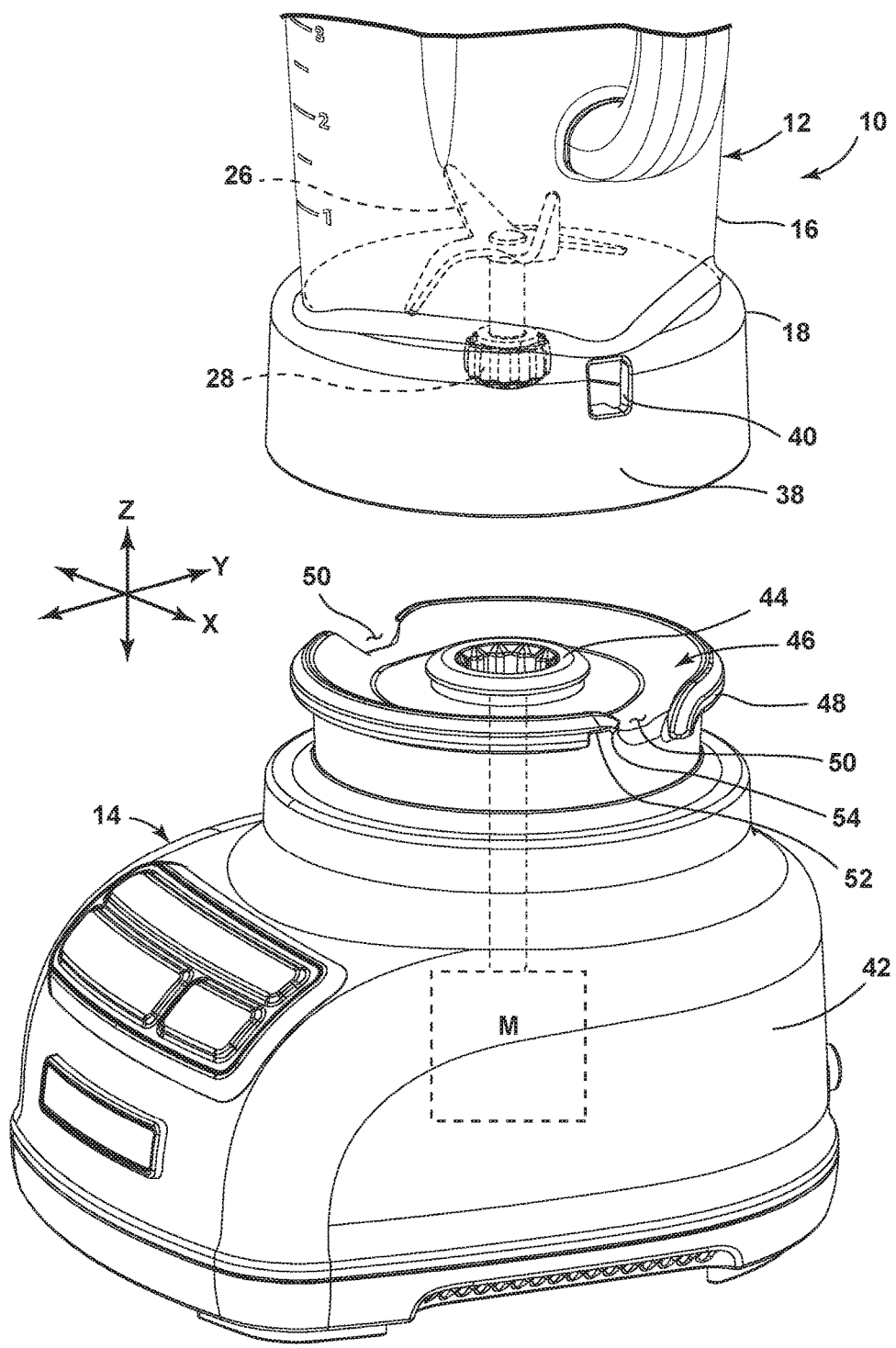
FIG. 1 is a partial top perspective view of a blender.

For purposes of description herein, the terms "upper," "lower," "right," "left," "rear," "front," "vertical," "horizontal," and derivatives thereof shall relate to the concept as oriented in FIG. 1. However, it is to be understood that the concept may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In the embodiment shown in FIG. 1, a blender 10 is shown. As used herein, the terms "blender" and/or "food processing device" both include a blender, food processor, or other device for processing food having a jar with a rotary tool for processing the food. The blender 10 includes a jar assembly 12 and a housing assembly 14. The jar assembly 12 includes a jar 16 and a collar 18 extending downwardly therefrom. The jar 16 may be any of a variety of jar constructions configured to operably couple with the housing assembly 14.

As shown in the embodiment depicted in FIG. 2, a shaft 20 extends through the bottom of the jar 16, having one end 22 that terminates inside the jar 16, and another end 24 that terminates below the bottom of the jar 16, radially inwardly from the collar 18. A blade 26 is fixedly attached to the end 22 inside the jar 16 and an upper coupler 28 is fixedly attached to the other end 24 of the shaft 20. Rotation of the upper coupler 28 drives rotation of the blade 26 inside the jar 16. A retainer assembly 30, including a bushing sleeve 32, a retainer 34, and a retainer nut 36, surround the shaft 20 and retain it in a fixed vertical position in relation to the bottom of the jar 16.

Figure 2:
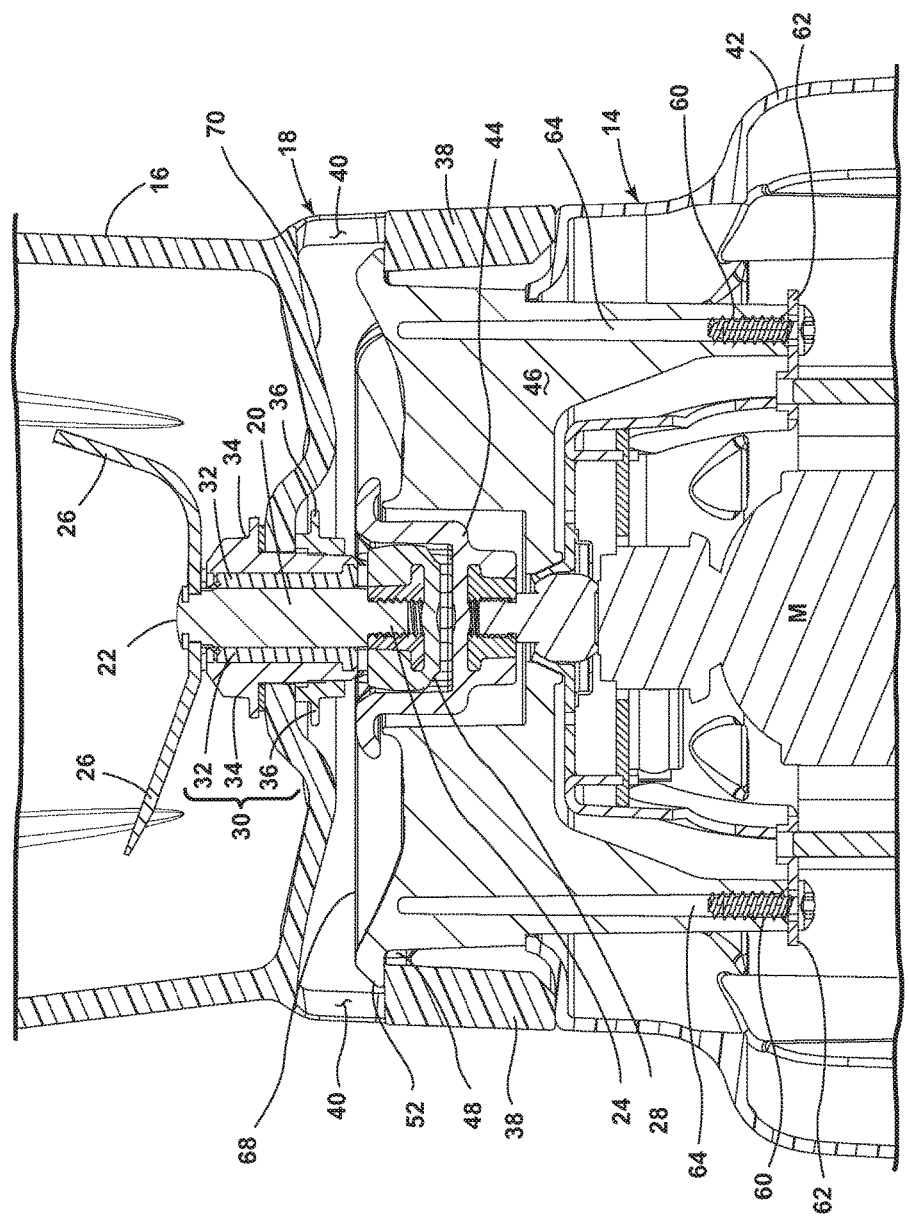
FIG. 2 is an enlarged side cross-sectional view of the blender, showing one embodiment of a blender jar lock.

Referring again to the embodiment as depicted in FIG. 2, the collar 18 includes a plurality of locking tabs 38 oriented in a generally vertical direction and extending inwardly toward the upper coupler 28. The collar 18 also includes a plurality of generally rectangular windows 40 therethrough. Each window 40 is above one of the locking tabs 38.

The housing assembly 14 as depicted in the embodiment shown in FIG. 2 includes a base 42 with a motor M disposed therein. A lower coupler 44 extends upwardly from the base 42, and is operably coupled to the motor M. Activation of the motor M causes rotation of the lower coupler 44. The lower coupler 44 is removably mechanically engageable with the upper coupler 28, such that the lower coupler 44 translates rotational movement to the upper coupler 28 upon engagement of the lower coupler 44 with the upper coupler 28, and thereby to the blade 26 inside the jar 16.

Also in the embodiment depicted in FIGS. 1-2, a cylindrical jar lock 46 is spaced circumferentially outwardly from the lower coupler 44 and extends upward from the base 42. The circumference of the cylindrical jar lock 46 is sized so that the cylindrical jar lock 46 fits closely within the collar 18 of the jar assembly 12. As best shown in the embodiment depicted in FIG. 1, the cylindrical jar lock 46 includes a ridge 48 around the upper circumference thereof. The ridge 48 is interrupted by a plurality of openings 50, each opening 50 adjacent a notch 52, with a tapered step 54 separating the opening 50 and the notch 52. Each of the openings 50 has dimensions sufficient to allow the passage of one of the plurality of locking tabs 38 through the opening 50. The tapered steps 54 have dimensions adapted to retain the locking tabs 38 in the notches 52, and prevent them from rotating to the openings 50. Retention of the locking tabs 38 within the notches 52 limits the vertical and rotational movement of the jar assembly 12 with respect to the cylindrical jar lock 46.

The plurality of openings 50 correspond with the plurality of locking tabs 38 on the collar 18, so that the openings 50 align with the locking tabs 38 when the collar 18 is placed vertically above the cylindrical jar lock 46. The number of openings 50 is at least as large as the number of locking tabs 38, and may be greater than the number of locking tabs 38, provided that there is at least one opening 50 to correspond with each locking tab 38. For example, the cylindrical jar lock 46 could be provided with four openings 50, while the collar 18 includes only two locking tabs 38, so long as the spacing of the openings 50 permits the locking tabs 38 to be aligned with the openings 50.

The cylindrical jar lock 46 in the embodiment as depicted in FIG. 2 is fixed in a vertical direction with respect to the base 42. In the embodiment depicted in FIG. 2, the cylindrical jar lock 46 is coupled to the housing assembly 14 with a plurality of screws 60 which extend through a plurality of flanges 62 in the base 42, with each screw 60 extending into a screw receiving portion 64 of the cylindrical jar lock 46.

Figure 3:
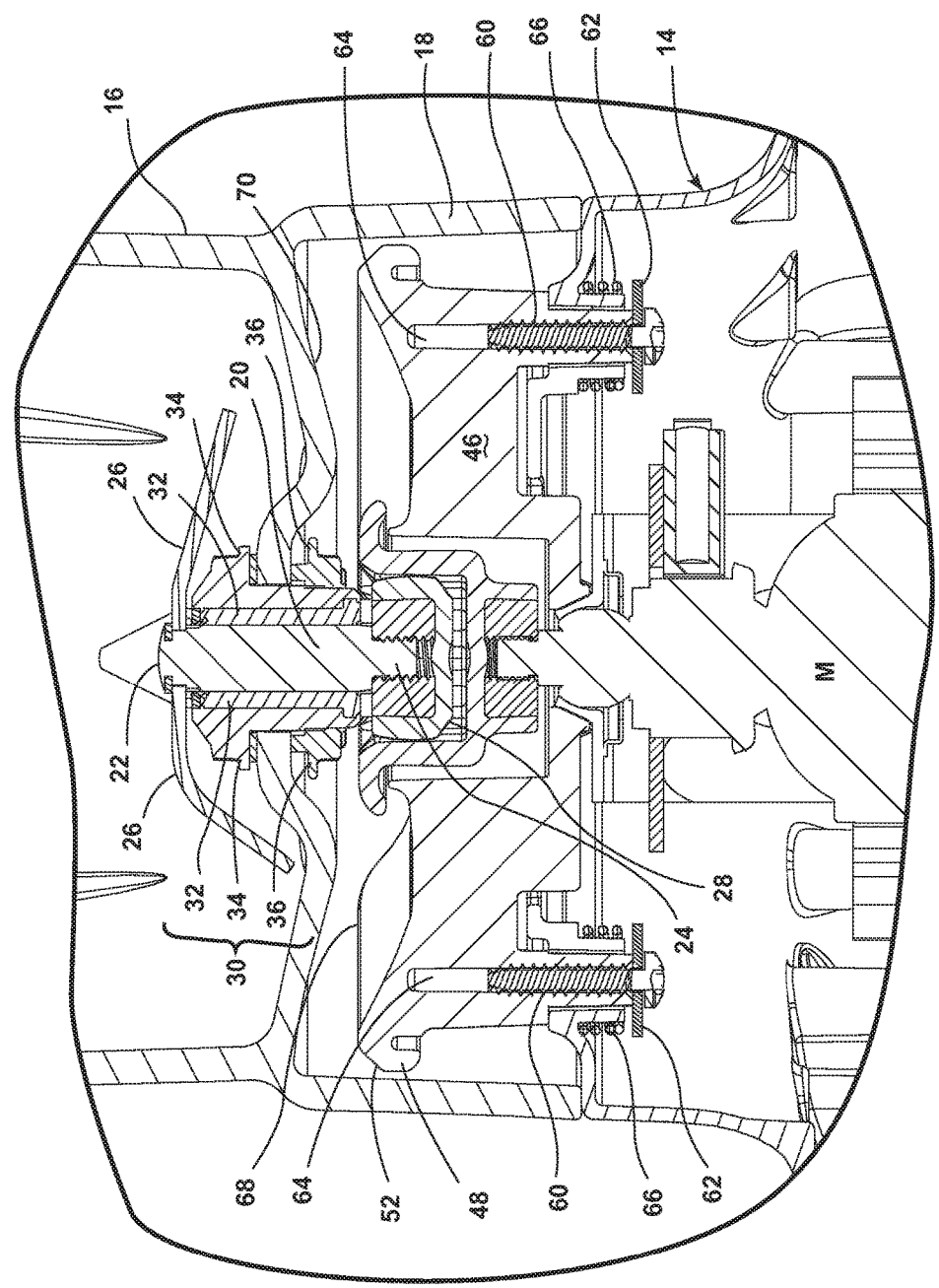
FIG. 3 is an enlarged side cross-sectional view of a blender, showing another embodiment of a blender jar lock.

In an alternate embodiment as depicted in FIG. 3, where like parts are given the same reference numerals as above, the cylindrical jar lock 46 is mounted to the housing assembly 14 such that the cylindrical jar lock 46 is permitted to move in a vertical direction (along the z-axis) with respect to the housing assembly 14, and the movement is dampened. In the embodiment depicted in FIG. 3, a spring 66 dampens vertical movement at the coupling between the cylindrical jar lock 46 and the base 42. The lower coupler 44 is optionally operably coupled with the cylindrical jar lock 46 to move therewith over a vertical range with respect to the base 42. Dampened vertical motion of the cylindrical jar lock 46 with respect to the base 42 absorbs vertical loads and vibration created by rotating the blade 26 to mix ingredients in the jar 16.

In use, the jar assembly 12 is aligned over the cylindrical jar lock 46 with the plurality of locking tabs 38 aligned with the plurality of openings 50. The jar assembly 12 is then lowered over the jar lock 46, and twisted so that each locking tab 38 passes under the tapered step 54 and engages with the corresponding notch 52. When the jar assembly 12 is coupled to the cylindrical jar lock 46, the jar assembly 12 does not physically touch and is free of engagement with an upper surface 68 of the cylindrical jar lock 46. More specifically, when the jar assembly 12 is coupled to the cylindrical jar lock 46, an underside 70 of the jar 16 does not touch and is free of engagement with the upper surface 68 of the cylindrical jar lock 46.

The plurality of openings 50 and notches 52 in the ridge 48 around the cylindrical jar lock 46 engage with the plurality of locking tabs 38 and windows 40 in such a way that vertical movement of the jar assembly 12 with respect to the cylindrical jar lock 46 is restrained. The locking tabs 38 are vertically restrained below the notches 52, with the ridge 48 protruding through the plurality of windows 40 as shown in the embodiment depicted in FIG. 2. However, the dimensions of the notches 52, the tapered steps 54, and the plurality of locking tabs 38 are such that some rotational motion (clockwise-counterclockwise) and some linear motion (in the x-y plane) of the jar assembly 12 with respect to the housing assembly 14 is permitted while the jar assembly 12 is coupled to the cylindrical jar lock 46. The notches 52 have a width that is larger than the width of the locking tabs 38, to permit rotational movement. Additionally, the circumference of the ridge 48 is sufficiently less than the collar 18 to permit some linear movement of the jar assembly 12 with respect to the housing assembly 14. The cylindrical jar lock 46 may also be fabricated from a material that has some flexibility to permit such movement of the jar assembly 12 with respect to the housing assembly 14.

To blend food or other items in the blender 10, the motor M is activated when the jar assembly 12 is mated with the housing assembly 14, with the collar 18 engaging the cylindrical jar lock 46 such that the upper coupler 28 is mechanically engaged with the lower coupler 44. The motor M is operably connected with the lower coupler 44, and upon activation the motor M causes the lower coupler to rotate. The mechanical engagement of the lower coupler 44 with the upper coupler 28 allows the lower coupler to drive rotation of the upper coupler 28, thereby causing the blade 26 to rotate.

The rotational movement and linear movement permitted in the x-y plane of the jar assembly 12 with respect to the housing assembly 14 allow the lower coupler 44 to engage the upper coupler 28 efficiently, and allows the couplers 44, 28 to remain engaged during use, reducing wear and allowing a natural coupler alignment. The coupling between the jar assembly 12 and the housing assembly 14 described herein provides a tolerance for the fit between the lower coupler 44 and the upper coupler 28.

The blender 10 described herein could also include other rotary tools for use in the jar assembly 12, such as a chopper, grater, or any other rotary tool used for food processing in place of the blade 26 or in addition thereto.

It is also important to note that the construction and arrangement of the elements of the concept as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present concept. The exemplary structures and processes disclosed herein are for illustrative purposes and are not to be construed as limiting.

It is also to be understood that variations and modifications can be made on the aforementioned structures and methods without departing from the concepts of the present concept, and further it is to be understood that such concepts are intended to be covered by the following claims unless these claims by their language expressly state otherwise.

What is claimed is:

1. A food processing machine, comprising:
a base;
a cylindrical jar lock extending upwardly from a top surface of the base;
a ridge extending radially outwardly about a circumference of the cylindrical jar lock;
a plurality of notches in the ridge;
a jar assembly having a jar and a collar that extends downwardly from the jar, wherein the collar is adapted to fit circumferentially around the cylindrical jar lock; and
a plurality of locking tabs extending radially inwardly from the collar, wherein the locking tabs engage with the cylindrical jar lock and prevent vertical movement of the jar with respect to the cylindrical jar lock while allowing rotational and lateral movement of the jar in an xy-plane of the jar with respect to the base, wherein the rotational movement of the jar relative to the base is permitted by the notches having a width that is larger than a width of the locking tabs.

2. The food processing machine of claim 1, wherein the cylindrical jar lock is in a fixed vertical position with respect to the base, and wherein the locking tabs are engaged with the cylindrical jar lock and prevent vertical movement of the jar with respect to the base.

3. The food processing machine of claim 1, wherein the ridge is interrupted by a plurality of openings wherein each of the openings has dimensions sufficient to allow passage of one of the locking tabs.

4. The food processing machine of claim 3, wherein each of the plurality of notches is associated with one of the plurality of openings, and wherein each of the plurality of locking tabs corresponds with one of the notches and the associated opening, and wherein the notches and the locking tabs have relative dimensions that permit the rotational movement of the jar with respect to the base when the locking tabs are received in the notches.

5. The food processing machine of claim 4, further comprising:
a plurality of tapered steps formed in the ridge, wherein each tapered step separates one of the notches from the associated opening, and wherein the tapered steps are adapted to retain the locking tabs in the notches.

6. A food processing machine, comprising:
a base with a motor disposed therein;
a cylindrical jar lock extending upwardly from a top surface of the base;
a jar assembly having a jar and a collar that extends downwardly from the jar, wherein the collar is adapted to fit circumferentially around the cylindrical jar lock;
a plurality of locking tabs extending radially inwardly from the collar, wherein the locking tabs engage with the cylindrical jar lock and prevent vertical movement of the jar assembly with respect to the cylindrical jar lock while allowing rotational movement of the jar assembly with respect to the base;
a plurality of windows in the collar each corresponding with one of the plurality of locking tabs;
a ridge integrally formed with the cylindrical jar lock that protrudes at least partially through the plurality of windows when the jar is vertically restrained by the cylindrical jar lock; and
a plurality of notches in the ridge, wherein the rotational movement that is permitted between the jar assembly and the base is at least equal to a difference in a width of the notches and a width of the locking tabs.

7. The food processing machine of claim 6, wherein the locking tabs engage with the cylindrical jar lock such that lateral movement of the jar assembly in the xy-plane with respect to the base is permitted while the motor is engaged.

8. The food processing machine of claim 6, wherein the rotational movement of the jar assembly with respect to the base is permitted while the motor is engaged.

9. The food processing machine of claim 8, wherein the ridge extends radially outwardly and circumferentially about the cylindrical jar lock, and wherein the plurality of locking tabs engage with an underside of the ridge.

10. The food processing machine of claim 9, wherein the ridge further comprises:
a plurality of openings, wherein each notch is adjacent one of the plurality of openings and separated from the opening by a tapered step.

11. The food processing machine of claim 10, wherein each locking tab is insertable through one of the openings and is adapted to be vertically restrained below the notch.

12. The food processing machine of claim 11, wherein the rotational movement of the jar assembly relative to the base is permitted by the width of the notches being larger than the width of the locking tabs.

13. A food processing machine, comprising:
a base with a motor disposed therein;
a cylindrical jar lock extending upwardly from a top surface of the base;
a jar assembly having a jar and a collar that extends downwardly from the jar, wherein the collar is adapted to fit circumferentially around the cylindrical jar lock; and
a plurality of locking tabs extending radially inwardly from the collar, wherein the locking tabs engage with the cylindrical jar lock and prevent vertical movement of the jar assembly with respect to the cylindrical jar lock while allowing rotational and lateral movement of the jar assembly in an xy-plane with respect to the base while the motor is engaged, and wherein the rotational movement that is permitted between the jar assembly and the base is at least equal to a difference in a width of the locking tabs and a width of an associated notch.

14. The food processing machine of claim 13, wherein the rotational movement of the jar assembly relative to the base is permitted by the width of the notches being larger than the width of the locking tabs.

15. The food processing machine of claim 14, further comprising:
a plurality of windows in the collar each corresponding with one of the plurality of locking tabs.

16. The food processing machine of claim 15, further comprising:
   a ridge integrally formed with the cylindrical jar lock that extends radially outwardly and circumferentially about the cylindrical jar lock, wherein the plurality of locking tabs engage with an underside of the ridge, and wherein the ridge protrudes at least partially through the plurality of windows when the jar is vertically restrained by the cylindrical jar lock.

* * * * *